Nov. 15, 1966 P. F. ROSSMANN 3,285,372

SELF-ENERGIZATION SPOT TYPE BRAKE SYSTEMS

Filed March 24, 1965 6 Sheets-Sheet 1

INVENTOR.
PETER F. ROSSMANN
BY
ATTORNEYS

Nov. 15, 1966  P. F. ROSSMANN  3,285,372
SELF-ENERGIZATION SPOT TYPE BRAKE SYSTEMS
Filed March 24, 1965  6 Sheets-Sheet 2

INVENTOR.
PETER F. ROSSMANN
BY
Barnes, Kisselle, Raisch & Choate
ATTORNEYS Nov. 15, 1966   P. F. ROSSMANN   3,285,372
SELF-ENERGIZATION SPOT TYPE BRAKE SYSTEMS
Filed March 24, 1965   6 Sheets-Sheet 5

INVENTOR.
PETER F. ROSSMANN
BY
Barnes, Kisselle, Raisch & Choate
ATTORNEYS

United States Patent Office 3,285,372
Patented Nov. 15, 1966

3,285,372
SELF-ENERGIZATION SPOT TYPE
BRAKE SYSTEMS
Peter F. Rossmann, Irvine, Pa.
(134 Merriweather Road, Grosse Pointe Farms, Mich.)
Filed Mar. 24, 1965, Ser. No. 442,438
19 Claims. (Cl. 188—73)

This invention generally relates to brakes and in particular to disc brakes of the caliper or vise grip type such as shown in United States Patents 3,064,768, 2,934,173 and 2,888,104.

In disc brakes it is common to have a non-rotatable torque resisting member supported in fixed axial position relative to a rotatable brake disc which is secured to a wheel or other rotatable structure to be braked. The torque member has a brake cylinder extending perpendicular to the radial side face of the disc in which a piston is reciprocably housed which in turn carries a friction pad on its outer end adjacent the disc. The piston is usually actuated by hydraulic brake fluid to drive the pad into frictional braking engagement with the side of the disc. In a caliper type disc brake, the non-rotatable torque member or housing is designed to straddle the brake disc and has a pair of brake cylinder and piston units disposed for engagement with opposite sides of the disc. The cylinders on opposite sides of the disc are pressurized from a common source of hydraulic brake fluid to in effect clamp the disc between the opposed friction pads of the respective cylinder units.

An object of the present invention is to improve disc brake systems of the above type by providing improved servoaction structure whereby upon application of externally generated braking force a self-energizing braking force is derived from the torque applied to the disc by the vehicle wheel or other rotatable structure attached to the disc.

Another object of my invention is to provide a disc brake system of the above character wherein self-energization is obtained with inexpensive, and highly reliable structure which requires a minimum of redesign of existing disc brake systems.

A further object is to provide a self-energizing disc brake mechanism for a vehicle which is responsive to control by the usual hydraulic brake fluid system of the vehicle and also, either alternately or conjointly, to the hand brake, or emergency brake control system of the vehicle.

Still another object is to provide a disc brake mechanism of the above character having improved automatic take-up mechanisms for compensating for normal wear of the frictional brake lining material and/or servo-structure employed in the brake mechanism.

Other objects, features and advantages of the present invention will become apparent from the following detailed description taken in conjunction with the accompanying drawings wherein:

Referring to FIGS. 1–7 inclusive, a self-energizing disc brake of the present invention is shown in a caliper type arrangement which straddles a disc 30 for applying braking force thereto. Disc 30 may be any of the usual types employed in disc brakes and is adapted to be secured to a wheel or other rotatable structure to be braked, the disc rotating about its axis 32 upon rotation of such structure. A caliper type housing 34 is connected by a support 33 to suitable structure adapted to resist rotation of disc 30, such as the axle housing of an automotive vehicle (not shown). Housing 34 is generally in the shape of a yoke having a pair of coaxial cylinder bores 36 and 38 the inner ends of which are open and spaced from opposite sides of disc 30. The axis 52 of bores 36, 38 is oriented parallel to axis 32 of disc 30 and is located between axis 32 and the periphery 56 of the disc. Cylinder bores 36 and 38 each contain a cylindrical piston 40 and 42 respectively (FIG. 5) which is adapted to both slide and rotate in the cylinder bore. Pistons 40 and 42 each carry a suitable fluid seal, such as an O-ring 44, adjacent the inner end of the piston. Each piston 40, 42 and the closed end of cylinder 36, 38 define a fluid working chamber 46 which communicates via an inlet 48 with the usual hydraulic fluid line running from the master cylinder unit of a conventional hydraulic brake system (not shown). Since the parts of the left hand brake cylinder unit 38–42 are identical in the various illustrated embodiments with the right hand cylinder unit 36–40, for the most part only the right hand cylinder unit is generally shown and described in detail hereinafter. It is also to be understood that in accordance with the present invention only one cylinder and piston unit need be employed, as is customary in vise grip type friction disc brakes such as that shown in United States Patent 2,888,104.

Figures 1, 2, 3, 4:
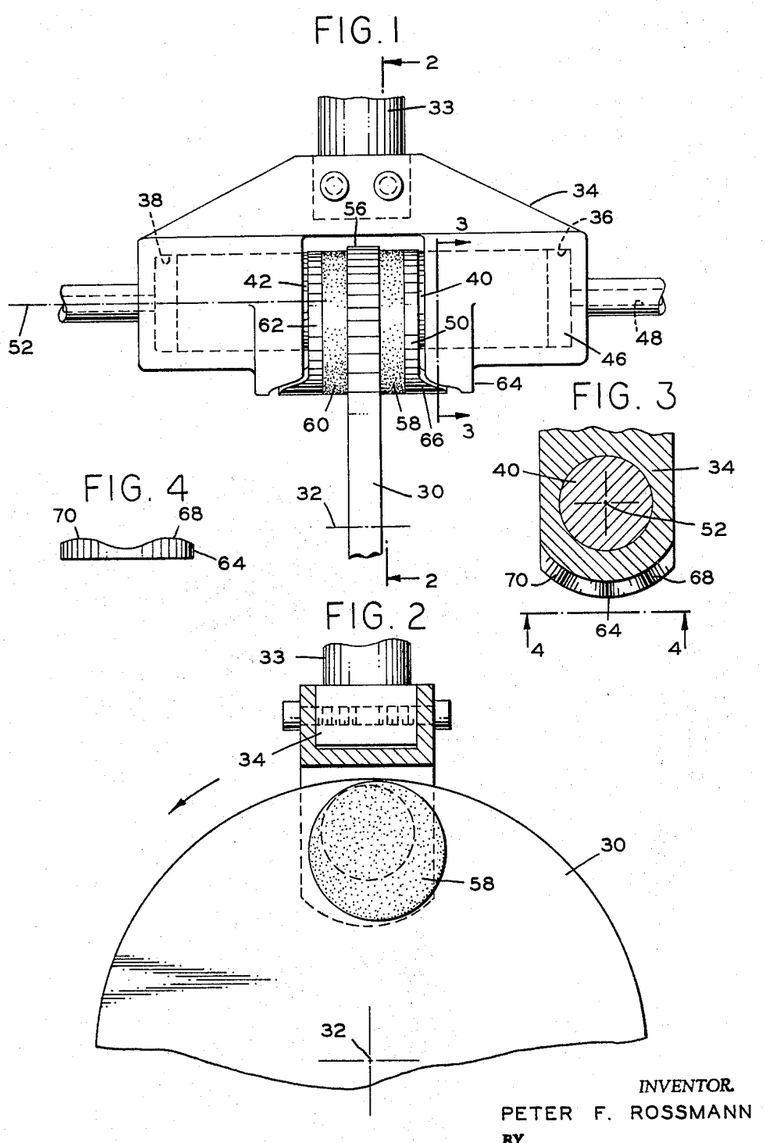
FIG. 1 is a fragmentary elevational view illustrating in simplified form a caliper type disc brake embodiment of the invention.
FIGS. 2 and 3 are sectional views taken respectively on the lines 2—2 and 3—3 of FIG. 1.
FIG. 4 is an end elevational view of the structure shown in FIG. 3 viewed from the line 4—4 of FIG. 3.
Figure 5:
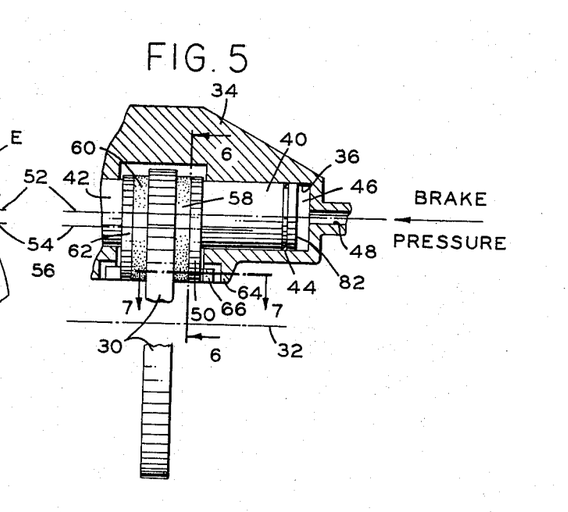
FIG. 5 is a fragmentary center section through the brake unit of FIG. 1.
Figure 6:
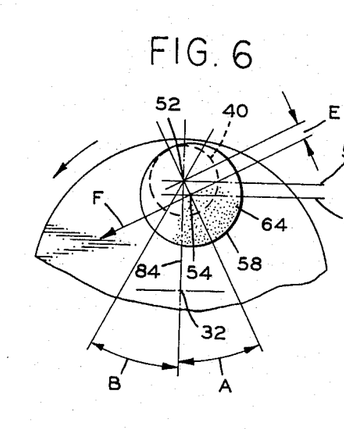
FIG. 6 is a semi-schematic side elevational view corresponding to FIG. 2 and taken on the line 6—6 of FIG. 5.
Figure 7:
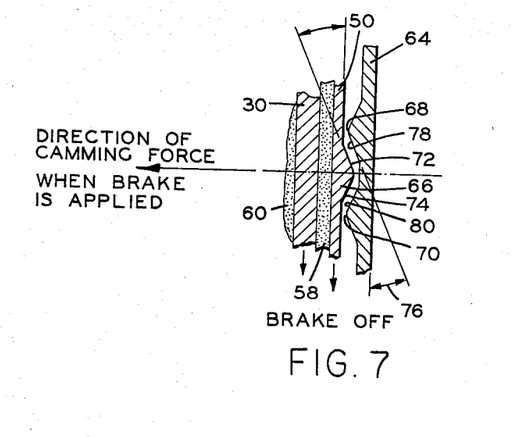
FIG. 7 is a fragmentary sectional view taken on the line 7—7 of FIG. 5 but with the sectioned parts laid out in plan development.

In accordance with the present invention the outer end of piston 40 has a radially projecting circular flange 50 integral therewith which is larger in diameter than piston 40 and has its center 54 located eccentrically relative to axis 52 of piston 40. This relationship is best seen in FIGS. 5 and 6 wherein eccentricity is designated E. A circular pad 58 made of suitable brake lining friction material is secured as by an adhesive or known detachable connecting means to the outerface of flange 50 in peripherally flush relation therewith. A similar pad 60 is likewise secured to flange 62 of piston 42. The geometrical center of the outer frictional face 64 of pad 58 coincides with the center 54 of flange 50 and is thus eccentric to the piston axis 52 by the amount E (FIG. 6).

Cooperating self-energization cam means are provided on the piston and housing which in the embodiment of FIGS. 1–7 are located externally of the cylinder. Thus, housing 34 has a stationary cam 64 cast integral with the underside thereof, and piston 40 has a cam 66 cast integrally with the backside of flange 50 so as to project parallel to axis 52 into circumferentially overlapping engageable relation with cam 64. This relationship is best seen in the plan development layout of FIG. 7. Stationary cam 64 has a pair of lobes 68 and 70 spaced circumferentially apart, whereas rotary cam 66 is formed as a single lobe which in the brake-off position (FIG. 7) is centered between lobes 68 and 70. The ramps 72 and 74 of cam 66 are disposed at a non-locking angle 76 relative to ramps 78 and 80 of the stationary cam 64.

In operation, when brake fluid in chamber 46 is pressurized as by depressing the foot pedal of the hydraulic brake system, the resulting fluid pressure acting on the inner face 82 of piston 40 forces it axially toward disc 30, piston 42 likewise being driven axially toward disc 30. This brings friction pads 58 and 60 into contact with the respectively adjacent faces of disc 30. Assuming that disc 30 is rotating in the direction of the arrows in FIGS. 3, 6 and 7, and that pad 58 is angularly oriented relative to a radius line 84 intersecting axes 32 and 52 (FIG. 6) when cam 66 is centered between cam lobes 68 and 70, disc 30 will thereupon exert a resultant frictional dragging force on pad 58 as diagrammatically indicated by the arrow F in FIG. 6. This force in turn develops a clockwise turning moment on piston 40 as viewed in FIG. 6 due to the eccentricity E of pad 58 relative to axis 52 of the piston, thereby causing pad 58, flange 50 and piston 40 to rotate together about axis 52 through an angle A (FIG. 6). During this rotation ramp 72 slidably contacts ramp 78 and develops an axial component of force tending to drive flange 50 and hence friction pad 58 toward disc 30. This axial component of force is supplemental to and generally directly proportional to the force resulting from fluid pressure acting on piston 40 since it is dependent upon the friction generated between pad 58 and disc 30 and the torque exerted by the disc. Accordingly, a self-energizing or servoaction is obtained through frictionally induced rotation of the piston and the conversion of this torque into an axial braking component by cams 66 and 64, thereby utilizing the static or dynamic externally developed torque acting on disc 30 to develop part of the braking force exerted via friction pad 58 on disc 30. The same action occurs with respect to brake piston 42 and pad 60. The efficiency of the braking mechanism is thereby greatly increased.

Cam angle 76 is designed with respect to the frictional characteristics of the stationary and rotatable cams 64 and 66 so as to be non-locking to insure that the cam is released when fluid pressure on the piston 40 is relieved. Preferably cam 66 is symmetrical with respect to the two lobes 68 and 70 of the stationary cam 64 so that the brake units can be interchangeably used on the brakes of all four wheels of a vehicle, and can be reverse mounted on disc 30 without affecting their action. The second lobe 70 of cam 64 is provided in the event that self-energization is required when brake disc 30 rotates in the reverse direction, as when the vehicle is being braked when traveling in reverse. The location of cams 66 and 64 adjacent the cantilever supported eccentric area of flange 50 helps insure uniform contact pressure over the entire face of pad 50 and reduces moments tending to tilt piston 40 in its cylinder. Preferably cams 64 and 66 are designed so that the amount of initial self-energization rotation of piston 40 is through angle A, and subsequently as pad 58 wears further rotation through an angle B (FIG. 6) can occur while the cams are in operative sliding engagement. It is to be understood that the above construction may be modified as illustrated in other embodiments described hereinafter such that the eccentricity of the flange 50 is radially outwardly of axis 52 rather than radially inwardly thereof as shown. Also, as described subsequently the area of friction pad 58 may have other than a circular profile, constant adjustment structure may be provided for compensating for wear of pad 58, restoring springs for axially retracting the piston and rotatably returning it to a neutral position as well as stops for limiting the maximum rotation of the piston in its cylinder may be provided.

Figure 8:
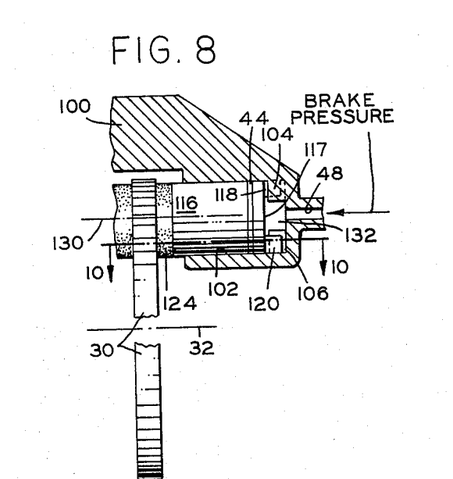
FIG. 8 is a fragmentary sectional view of a modified form of the invention illustrated in the manner of FIG. 5.
Figure 9:
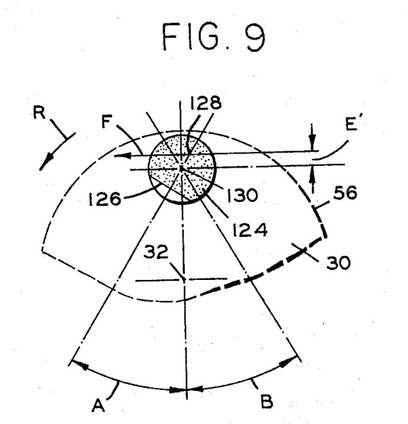
FIG. 9 is a side elevational schematic view of the embodiment of FIG. 8 illustrated in a manner similar to FIG. 6.
Figure 10:
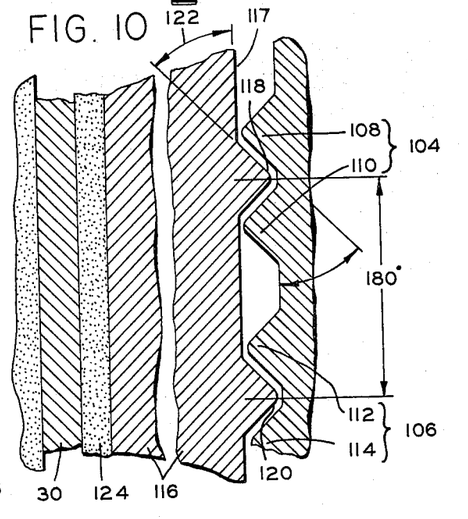
FIG. 10 is a greatly enlarged sectional view taken on the line 10—10 of FIG. 8 illustrating the sectioned parts in a developed plan layout.

Referring to FIGS. 8, 9 and 10, a modified disc brake system is illustrated wherein the self-energization cams are disposed internally within the fluid working chamber of the brake cylinder, and self-energizing torque is obtained by using a friction pad mounted concentrically on the piston but having a portion removed to shift the center of frictional resistance off-center relative to the piston. In this embodiment caliper frame 100 is modified with respect to the end face of cylinder bore 102 to have a pair of stationary cams 104 and 106 (FIG. 8) formed integrally therewith diametrically opposite one another and contoured as best shown in the plan development of FIG. 10. Cam 104 comprises a pair of lobes 108 and 110 and cam 106 comprises lobes 112 and 114. Piston 116 has integrally formed on its inner end face 117 a pair of cams 118 and 120 disposed 180 degrees apart to respectively cooperate with stationary cams 104 and 106. The interengaging ramps of the respective cams are disposed at non-locking angle 122 as shown in FIG. 10.

Piston 116 differs from piston 40 in that it is cylindrical throughout, flange 50 being omitted. A modified friction pad 124 is fixed to the outer end face of piston 116 which as best seen in FIG. 9 has a chordal segment cut away so that a portion 126 of its periphery is flatted so that its center of frictional resistance 128 is eccentrically located radially outwardly of axis 130 of piston 116 to thereby develop the eccentric moment arm E′.

In the operation of the embodiment of FIGS. 8–10, when fluid pressure is developed in the working chamber 132 of brake cylinder 102, pad 124 is forced into flat fractional rubbing contact with the adjacent side of disc 30. Assuming disc 30 is rotating in the direction of the arrow R of FIG. 9, a resultant frictional dragging force F is exerted on pad 124 by disc 30 which produces a counterclockwise torque on piston 116 to thereby rotate piston 116 and its cams 118 and 120 into self-energizing sliding engagement with cams 104 and 106 to generate a self-energizing braking force cumulative to the applied fluid pressure. As in the previous embodiment the cams contact one another during the first angular portion A of piston rotation, and additional angular rotation B can subsequently occur to compensate for wear on pad 124. Also, the provision of two stationary cam lobes 108 and 110 and 112 and 114 for each rotatable cam lobe 118 and 120 permits interchangeable use and operation in either direction of rotation. The arrangement of a pair of cams 118 and 120 diametrically opposite one another on the end face of piston 116 provides a balanced axial component acting on the piston so that it does not tend to cant or tilt in the cylinder bore 102. The location of cams 104, 106 and 118, 120 interiorly of the cylinder in fluid chamber 132 protects the cams from dirt and provides constant lubrication of the cams by the hydraulic brake fluid, thereby insuring long life and efficient action of the cams.

Another feature of the embodiment of FIGS. 8–10 is the location of the center of resistance 128 of pad 124 relative to piston axis 130 outwardly therefrom radially of disc 30. This relationship takes advantage of an effect which is present to more or less degree in all disc brake constructions wherein the friction pads are disposed wholly on one side of the axis of disc 30. When such a friction pad having a symmetrical profile is brought against the side of the disc, due to the tangential velocity gradient radially of the disc, the portion of the disc contacting the radially outermost area of the pad exerts a greater frictional drag on the pad than do the more slowly traveling radially inwardly located areas of the disc. Thus there is developed a resultant frictional force acting on the pad which is eccentric to the center of rotation of the piston, thereby generating a turning moment which is cumulative to the self-energizing torque intentionally developed by imparting unbalanced geometry to the pad.

Figure 11:
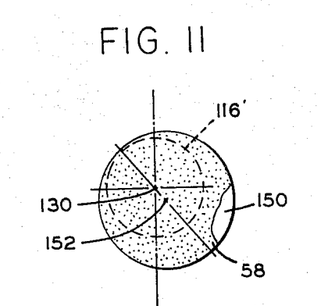
FIG. 11 is an end elevational view of a modified friction pad and piston arrangement of the invention.

FIG. 11 illustrates a modified piston 116' in phantom behind a circular friction pad 58 which is mounted in centered relation on an eccentric flange 150 of piston 116' in the manner of pad 58 and flange 50 of piston 40, thereby causing the center of resistance 152 to be offset from axis 130 of the piston to obtain the desired eccentricity for imparting rotation to the piston. Piston 116' has the cams 118 and 120 integral with its opposite end rather than having external cams as was the case with flange 50.

Figure 12:
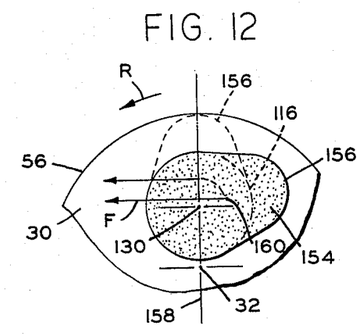
FIG. 12 is a side elevational view of a further modified friction pad and piston arrangement of the invention.

FIG. 12 illustrates a modified friction pad 154 affixed to the outer end of flangeless piston 116 and having an asymmetrical pear-shape with its small end 156 disposed on the leading side of the radius line 158 of disc 30 in the brake-off condition. With this relationship the center of frictional resistance 160 of pad 154 will shift radially outwardly of axis 130 of piston 116 as pad 154 rotates counterclockwise in response to being brought into frictional contact with disc 30. This causes the rotational torque acting on the piston to increase as a function of the angular displacement of the piston 116, thereby increasing the self-energizing force in a non-linear manner where this effect is desirable. By angularly shifting the neutral or brake-off position of end 156 to the dotted line position of FIG. 12, the opposite effect can be obtained.

Figures 13, 14, 15:
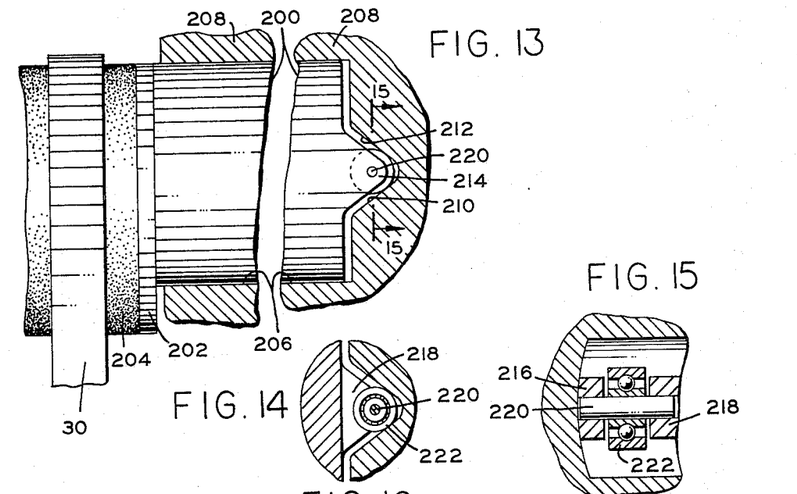
FIG. 13 is a fragmentary longitudinal section of another embodiment of the brake mechanism of the invention illustrating a roller follower in the servocam means of the mechanism.
FIG. 14 is a fragmentary sectional view showing the cam structure of FIG. 13 with a portion broken away to illustrate detail.
FIG. 15 is a sectional view taken on the line 15—15 of FIG. 13.

FIGS. 13–19 are directed to various modified cam structures which are shown adapted to the interiorly located cam arrangement of FIG. 8. Referring first to FIGS. 13–15, a modified piston 200 is shown having a flange 202 and friction pad 204 similar to flange 50 and pad 58 of piston 40 and disposed relative to disc 30 in the same manner. The piston 200 is housed in a bore 206 of a caliper housing 208 which is similar to housing 34 except that the inner end of cylinder 206 has formed therein V-shaped cam indentations diametrically opposite one another to provide the stationary cams of the brake mechanism. FIG. 13 is taken in section through one of the statitonary cams and illustrates the inclined cam ramps 210 and 212 thereof. The movable cams fixed 180 degrees apart to the inner end face of the piston 200 each comprise an axial projection 214 which is bifurcated to have a pair of arms 216 and 218 (FIG. 15) in which a pin 220 is mounted to support a ball bearing the outer race of which provides an anti-friction cam follower roller 222. Roller 222 engages cam ramps 210 or 212, depending upon the direction of rotation of disc 30, to develop the self-energizing braking force in a manner similar to the sliding cam embodiment described in connection with FIG. 8. The provision of the roller follower reduces friction and cam wear in applications where this may be a problem.

Figure 16:
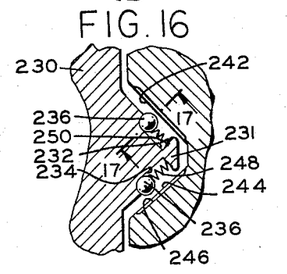
FIG. 16 is a view corresponding to FIG. 14 but illustrating another form of anti-friction cam means of the invention.
Figure 17:
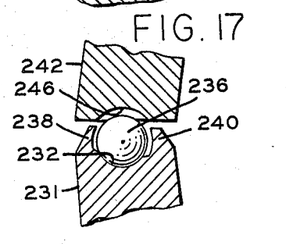
FIG. 17 is a sectional view taken on the line 17—17 of FIG. 16.

FIGS. 16 and 17 illustrate a further type of anti-friction cam construction wherein a piston 230, identical to piston 200 except for the stationary cams thereof, is fitted with V-shaped cam protuberances 231 having cam ramp grooves 232 and 234 formed in the inclined sides thereof each of which carries ball bearings 236 therein. Ramps 232 and 234 have inturned side edges 238 and 240 (FIG. 17) which retain the ball in the groove. The cooperating ramps 242 and 244 of the stationary cam may also have a shallow groove 246 for receiving the ball. A compression coil spring 248 is disposed one in each groove between ball 236 and a ramp abutment 250. Springs 248 serve to return balls 236 to their initial position at the end of the groove as shown in FIG. 16 when the brakes are released and the piston thereupon returns to its brake-off position.

Figure 18:
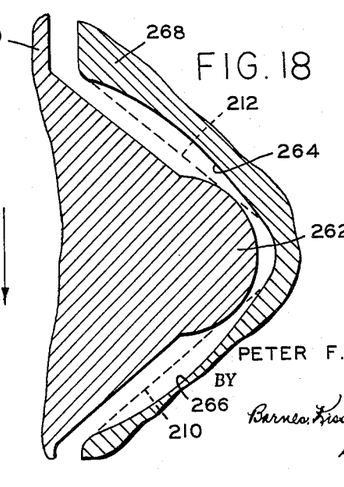
FIG. 18 is a fragmentary, greatly enlarged sectional view of a modified cam arrangement also in accordance with the present invention.
Figure 19:
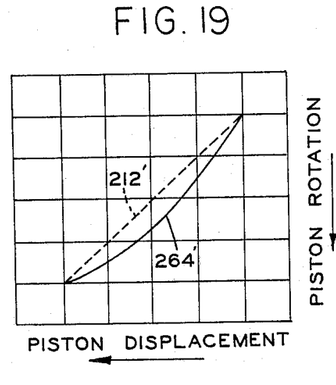
FIG. 19 is a graph of piston displacement versus piston rotation to illustrate the action of the cam means of FIG. 18.

FIGS. 18 and 19 illustrate a further form of cam construction applicable to sliding or roller follower variations in which the inner end face of a piston 260 is fitted with a cam lobe 262 which engages a contoured ramp 264 or 266 of a stationary cam 268 formed in the inner end wall of the brake cylinder in the manner of the stationary cam illustrated in FIG. 13. However, in this embodiment cam ramps 264 and 266 have a predetermined curvature to control or program the axial displacement acceleration of piston 260 during the brake self-energizing cycle, as contrasted with the previously illustrated straight or linear cam surfaces 210 and 212. Thus a plot of piston displacement versus piston rotation as shown in the graph of FIG. 19 will produce a non-linear curve 264' when cam lobe 262 engages ramp 264 as compared to the straight line displacement curve 212' produced by a straight ramp 212. This feature permits the designer to increase or decrease the braking force as a function of piston rotation to compensate for variations in torque caused by the frictional contact of the brake with the disc or to compound such variations, depending upon the effect desired, or to compensate for operating changese in the torque producing eccentricities.

Figures 20, 21, 22, 26:
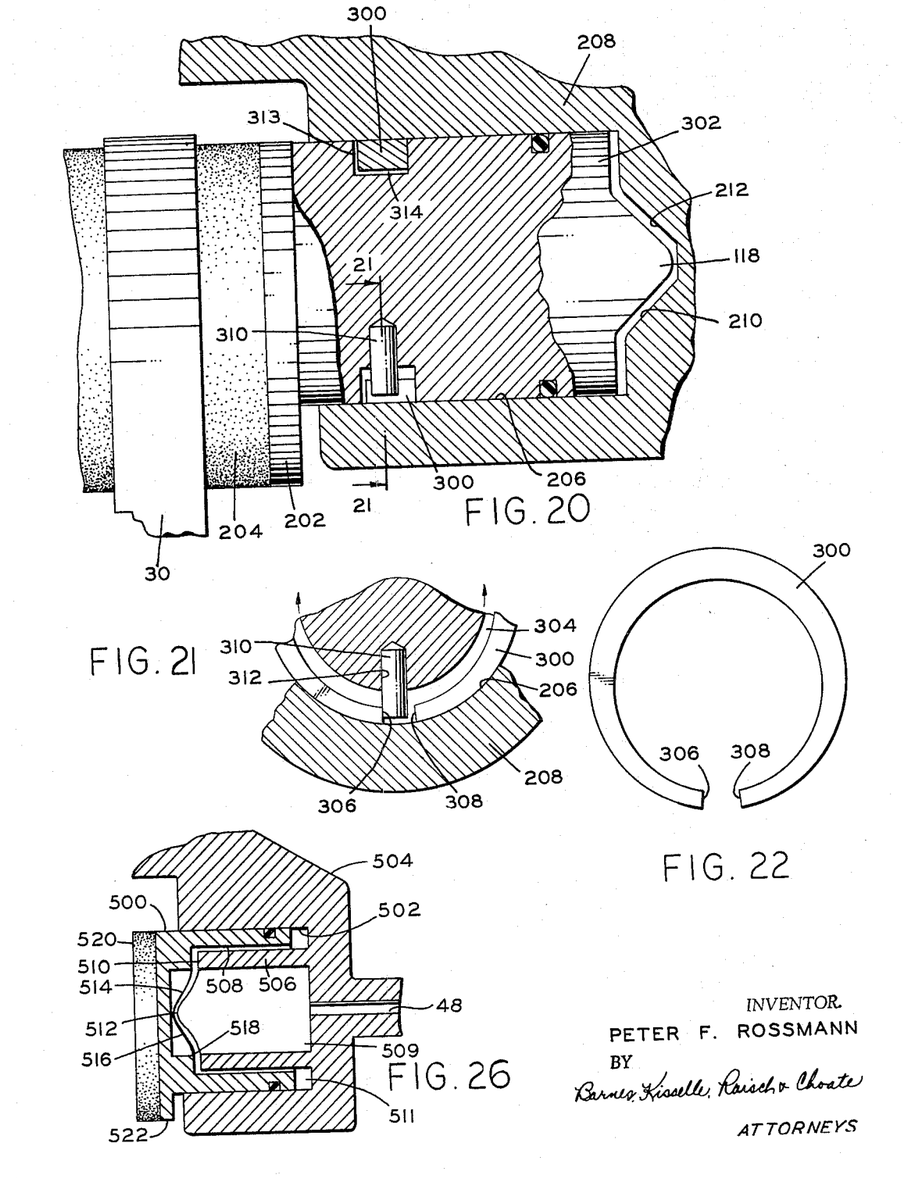
FIG. 20 is a fragmentary view partially in section of a disc brake unit incorporating a wear take-up device of the invention.
FIG. 21 is a sectional view taken on the line 21–21 of FIG. 20.
FIG. 22 is a plan view of a friction ring of the wear take-up device of the invention shown in FIGS. 20 and 21.
FIG. 26 is a sectional view similar to FIG. 20 but illustrating yet another modified construction of the brake mechanism of the invention incorporating a telescopic arrangement of the self-energizing cams.

FIGS. 20–22 illustrate a disc brake mechanism in accordance with the invention as described previously modified to incorporate an automatic wear take-up device. This device comprises a parted resilient ring 300 which is adapted to be compressed from its free state condition (FIG. 22) to a stressed radially contracted condition for reception in the cylinder bore 206. Ring 300 is assembled on a modified piston 302 by snapping ring 300 into an external circumferential groove 304 in the piston such that the parted ends 306 and 308 of ring 300 straddle the radially outwardly projecting end of a pin 310 which is secured in a radial hole 312 in the piston. When the piston and ring are installed in bore 206, ring 300 exerts a radially outwardly frictional dragging force on the wall of bore 206.

In operation, when the brake is applied during vehicle forward motion, the frictional force on pad 204 rotates piston 302 clockwise as viewed in FIG. 21, causing self-energizing cam parts 118 and 210 to interact. This rotation of the piston causes pin 310 to abut end 306 of the ring and then drag the ring circumferentially on the wall of bore 206 until the piston reaches the end limit of its rotational travel. When the brake is released, piston 302 is free to rotate a limited distance in the reverse direction (counterclockwise) as determined by the travel of pin 310 in the parting gap between ends 306 and 308 of the ring. When pin 310 strikes end 308, further reverse rotation of the piston is prevented since the reversing force is less than the static frictional force between ring 300 and bore 206. However when the vehicle moves in the reverse direction and the brakes are applied, piston 302 is rotated in a counterclockwise direction by the self-energizing force which is sufficient to overcome the dragging friction of ring 300, whereupon pin 310 pushes end 308 to thereby drag ring 300 to the end limit of self-energizing rotation of the piston in the opposite direction. Again, upon release of the brakes clockwise rotation of the piston is limited to the ring gap spring. When the vehicle is again moving forward and the brake is applied to stop forward movement, the reverse sequence occurs and friction ring 300 is automatically restored by the dragging action to proper adjustment for forward braking.

Preferably, ring 300 has an axial dimension less than that of groove 304 to provide a predetermined axial clearance 313 in the groove. As pad 204 wears during use, ring 300 is dragged axially along the wall of bore 206 as piston 302 travels farther toward disc 30 due to the pad wearing away. The axial clearance allows piston 302 to retract slightly from contact with disc 30 when the brake is released, but the ring prevents the piston from returning all the way back to its original retracted position prior to pad wear. Ring 300 is preferably made with a tapered or contoured profile as shown in FIG. 22 which provides a uniform bending stress in the ring so that it exerts a constant expansion force along its circumference to thereby insure uniform frictional engagement with the wall of bore 206.

From the foregoing it will be evident that ring 300 compensates for wear of both friction pad 204 and cams 118, 210 and 212 by following both the rotational and axial movement of the piston, thus keeping the clearance between the self-energizing cams at a minimum and insuring that pad 204 is maintained closely adjacent disc 30 to thereby minimize the stroke of piston 302 when the brakes are applied.

Figure 23:
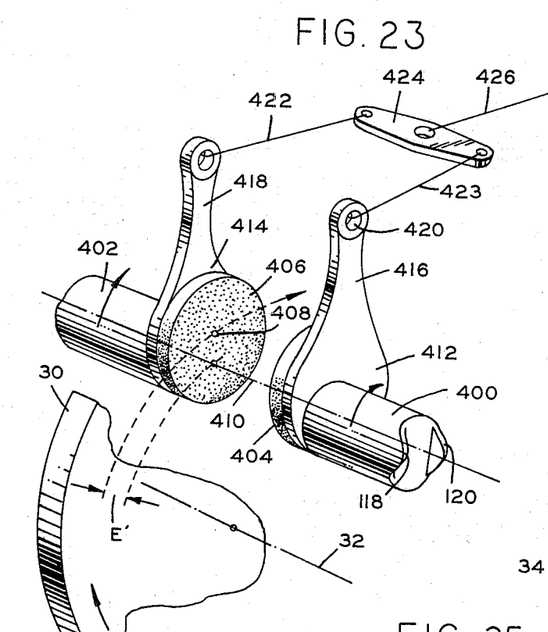
FIG. 23 is a perspective schematic view of a caliper type disc brake arrangement of the present invention illustrating a further modification incorporating a hand brake control system.
Figure 24:
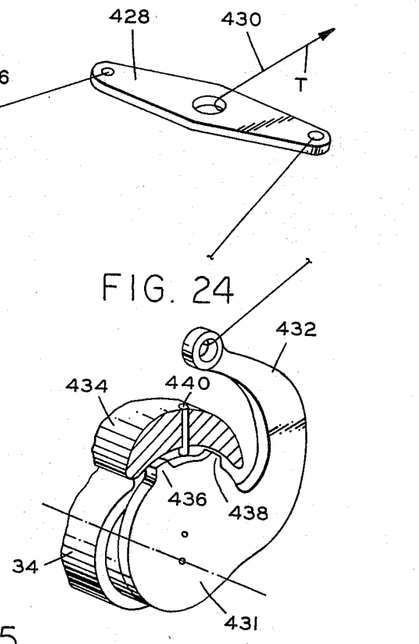
FIG. 24 is a perspective view illustrating a modified lever arm for use in the arrangement of FIG. 23.

Referring to FIGS. 23 and 24, a further modification of the disc brake mechanism of the present invention is shown which is controlled by both the primary fluid brake system and by an auxiliary hand or foot mechanical brake actuation system for applying braking force, for example, to the rear vehicle wheels in parking or emergency situations. Referring to FIG. 23, opposed pistons 400 and 402, housed in the manner of pistons 40 and 42 described previously, are fluid actuated to force their associated friction pads 404 and 406 against the opposite sides of disc 30 to apply braking force to the same. Pads 404 and 406 have their center of frictional resistance 408 disposed radially outwardly of the common axis 410 of pistons 400 and 402 to develop the torque on the pistons which is converted by cams 118 and 120 into an axial self-energizing brake force. Pads 404 and 406 are mounted on eccentric flanges 412 and 414 of pistons 400 and 402 respectively. These flanges each have an integral lever arm 416 and 418 respectively which extends radially outwardly parallel to the direction of eccentricity of the friction pads to the exterior of the brake housing 34 (not shown). Suitable means, such as a hole 420, is provided in the outer end of the arms 416, 418 for attachment to control linkage or flexible element 422 which by way of illustration may comprise the usual emergency brake cables. Cables 422 and 423 are rigged in the conventional manner via an equalizing lever 424 and cable 426 to another equalizing lever 428 which is pulled by the cable 430 attached to the hand brake (not shown). A similar rigging arrangement is used for the pair of identical brake disc units employed on the other rear wheel.

In operation, when the cable and equalization lever system is tensioned in the direction indicated by the arrow T in FIG. 23, as by pulling on the parking brake lever, pistons 400 and 402 are rotated clockwise as viewed in FIG. 23. This causes the internal self-energization camming mechanisms to operate as described in the previous embodiments to provide an axial force component for driving the brakes into frictional engagement with disc 30, thereby providing the braking power for holding the vehicle stationary. When used as an emergency brake to supplement or in lieu of the fluid brake control system, the forward motion of the vehicle develops self-energization force due to the eccentricity of the friction pads 406 and 404. When the vehicle is moving in reverse, the self-energizing torque would tend to resist the torque applied through the cable system, but sufficient mechanical advantage is provided in the system to compensate for this. There would be no self-energization for reverse braking, but this is usually considered unnecessary. In the released or off condition of the hand brake, sufficient slack is provided in the cable system to permit normal self-energization rotation of the brakes in either direction so that servoaction takes place during both forward and reverse fluid controlled braking.

Preferably, as shown in FIG 24, the embodiment of FIG. 23 is provided with a modified operating lever 432 which is suitably curved to clear the structural bridge 434 of the caliper housing 34. Also, the best seen in FIG. 25, a pair of radially projecting, circumferentially spaced stop lugs 436 and 438 are formed integrally on the peripheral edge of flange 431 so as to be disposed closely adjacent the underside of bridge 434 of housing 34. Bridge 434 has a pin 440 fixed therein so that its lower end projects downwardly from the underside of the bridge into the space between lugs 436 and 438. With this arrangement, pistons 400 and 402 can rotate only within the limits set by the abutment of pin 440 with lugs 436 and 438, thereby limiting the maximum forward and reverse rotation of the camming system.

Figure 25:
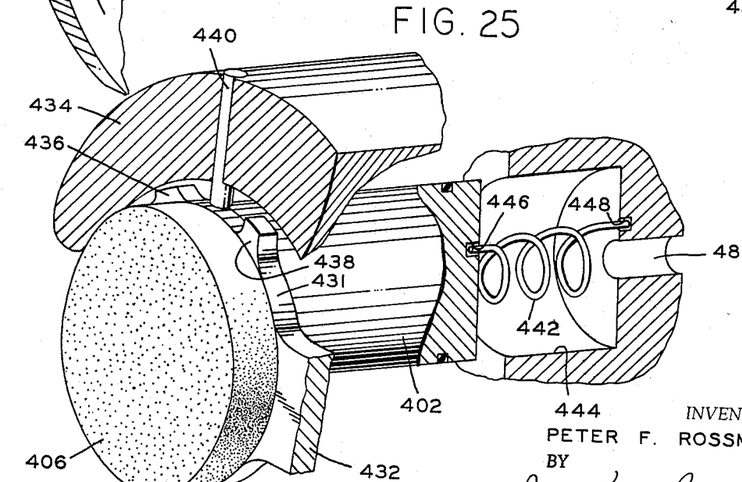
FIG. 25 is a perspective view of a further modified form of the invention incorporating a take-up spring and one form of stop means for controlling rotation of the piston, portions being broken away to illustrate details thereof.

In cases where it is desirable to have the various previously described rotatable and stationary self-energizing cams in slight contact in the brake-off position for zero take-up during braking, a compression coil spring 442 is provided between piston 402 and the inner end wall of the associated cylinder bore 444. The opposite ends of spring 442 are respectively received in a mounting hole 446 in the piston and a mounting hole 448 in the cylinder end wall. In this instance, spring 442 is designed to bias piston 402 axially toward disc 30 to maintain pad 406 in light rubbing contact with the disc, and also to exert a light torsional force to maintain the self-energizing rotary and stationary cams (not shown) in light contact. Alternatively, spring 442 may be a tension coil spring which is suitably fixed at its ends to the cylinder and piston respectively and designed to be always under tension to maintain the piston in an axially retracted position with its self-energizing cams in a neutral angularly centered position relative to one another. When thus used as a tension spring, spring 442 would serve as the axial retracting spring acting opposite to braking fluid pressure and as a torsional retracting spring acting opposite to the self-energizing torque developed on the pistons.

FIG. 26 illustrates a modified disc brake unit of the present invention wherein a modified piston 500 is slidably received in the cylinder bore 502 of a caliper housing 504. A hollow cylindrical integral extension 506 of housing 504 coaxially telescopes into a complementary blind bore 508 of piston 500 with a relatively large clearance fit which permits working fluid supplied via passage 48 to flow freely between the fluid chamber 509 and the annular chamber 511 formed between bore 502 and extension 506. The annular end face 510 of extension 506 is formed with a pair of cam lobes 512 spaced 180 degrees apart each of which cooperates in the manner of the previous embodiments with cam ramps 514 and 516 formed in the inner end face 518 of bore 508 of the piston to develop an axial component of force urging the friction pad 520 carried on eccentric flange 522 of piston 500 toward the associated brake disc 30 (not shown) in response to rotation of piston 500 induced by the eccentricity of pad 520 relative thereto. With this arrangement, the overall axial length of the piston and cylinder unit may be reduced to save space and thereby provide a more compact unit.

From the foregoing description, it will now be apparent that the disc brake system of the present invention provides an improved self-energizing disc brake in a very simple, economical and reliable manner which is readily adaptable to existing disc brake structures and which permits much design latitude according to the parameters of the particular application. For example, the cam lobe profiles can be programmed so that braking effort on the rear wheel brakes is less than that required for the front wheel brakes, or vice versa, thereby eliminating the need for complicated valving in the hydraulic brake conduits to achieve this relationship. In addition to developing servoaction in the brakes of the invention, the pad rotation contributes to a more uniform wearing action on both the pads and brake disc, thus minimizing scoring of the disc and increasing brake life. The units are readily interchangeable on all wheels and thus are economical from both the manufacturing and service standpoints. The disc brakes are readily adaptable to be used in conjunction with existing mechanical parking or emergency brake systems. The self-energizing cams may be varied as to their location internally and externally of the brake cylinder and oriented to produce optimum counterbalancing action to offset moments developed due to the particular form of eccentricity provided in the frictional pads, and the outer or top surfaces of caliper elements 34, 100 and 208 and caliper bridge 434 may be shot peened to introduce residual compressive stresses to resist the normal outward bending of the calipers during braking action.

I claim:

1. A disc brake mechanism for use with a disc fixed to rotatable structure to be braked, said disc brake mechanism comprising a housing adapted to be fixed to structure adapted to resist rotation of said disc with said housing positioned adjacent but spaced from the disc, said housing having a cylinder therein comprising a cylindrical bore oriented with its axis generally parallel to and offset from the axis of rotation of the disc between said disc axis and the periphery of the disc, a piston mounted in said cylinder bore for reciprocable movement along and rotational movement about the axis of said cylinder, said piston having one end projecting from said cylinder toward the disc, friction means on said one end of said piston adapted for face-to-face frictional contact with said disc and adapted to develop a resultant frictional force when in said contact tending to rotate said piston about said cylinder axis, means for moving said piston axially of said cylinder for urging said friction means into said frictional contact with the disc and cam means on said piston and housing cooperable in response to said frictionally induced rotation of said piston to develop an axial component of force on said piston urging the same toward the disc.

2. A disc brake mechanism as set forth in claim 1 wherein said cam means is disposed interiorly of said bore intermediate facing end faces of said piston and cylinder.

3. A disc brake mechanism as set forth in claim 2 wherein said piston includes means providing a slidable fluid tight fit of said piston in said bore to define a fluid chamber between said facing end faces and wherein said piston moving means comprises a hydraulic brake mechanism including a fluid line connected to said cylinder for supplying pressure fluid to said fluid chamber for developing a force urging said piston toward said disc, said cam means being disposed in the fluid chamber of said cylinder.

4. A disc brake mechanism as set forth in claim 1 wherein said friction means has a circular contact face area with its geometric center eccentric to the rotational axis of said piston.

5. A disc brake mechanism as set forth in claim 1 wherein said friction means has a face adapted to frictionally contact said disc and shaped such that the geometric center of said contact face is eccentric to said piston axis.

6. A disc brake mechanism as set forth in claim 1 wherein said friction means has a face adapted to contact said disc and shaped to provide a center of frictional resistance to rubbing contact therewith which is eccentric to the rotational axis of said piston.

7. A disc brake mechanism as set forth in claim 6 wherein said center of resistance is disposed radially between the axis of rotation of said piston and the periphery of said disc.

8. A disc brake mechanism as set forth in claim 6 wherein said center of resistance is disposed radially between the axes of rotation of said piston and said disc.

9. A disc brake mechanism as set forth in claim 1 wherein said piston has a radial flange on said one end thereof having a geometric center eccentric to the rotational axis of said piston, said friction means comprising a pad of brake lining material centered on said flange and being coperipheral therewith.

10. A disc brake mechanism as set forth in claim 1 wherein said friction means comprises a pad of friction material of circular shape about the major portion of its periphery disposed with the center of curvature of said major portion coincident with the axis of rotation of said piston, said pad having a minor portion of its periphery shaped such that the center of area is eccentric to the axis of rotation of said piston.

11. A disc brake mechanism as set forth in claim 1 wherein said friction means comprises a pad of friction material having a face adapted to frictionally contact said disc and disposed such that its geometric center is off set radially from the axis of rotation of said piston by a predetermined distance, said piston being oriented in a first angular position relative to said cylinder in the brake-off condition thereof, said pad having a shape predetermined such that said rotation thereof upon contact with said disc varies the angular orientation of said geometric center relative to a radial plane through the disc and piston axes so that the resultant torque acting on the piston varies as a function of its angular displacement from said first angular position.

12. A disc brake mechanism as set forth in claim 1 wherein said cam means is contoured in a predetermined manner to vary the developed axial force component as a function of the angular displacement of said piston relative to said cylinder.

13. A disc mechanism as set forth in claim 1 further including a parted ring disposed between said piston and cylinder in encircling relation to said piston, and means adapted to interengage said ring with said piston and cylinder to permit limited axial and rotational relative movement therebetween whereby said ring provides a predetermined frictional resistance to said axial and rotational relative movement of the piston and cylinder.

14. A disc brake mechanism as set forth in claim 1 wherein said piston has a lever arm connected to said one end thereof extending outwardly of said housing, and further including means connected to said arm for applying torque to said piston via the arm to thereby develop braking force by interengagement of said cam means.

15. A disc brake mechanism as set forth in claim 14 wherein said means connected to said arm comprises a flexible element connected at one end to said arm and adapted to be connected at the other end to a manually actuated hand brake control for tensioning said flexible element.

16. A disc brake mechanism as set forth in claim 1 and further including a torsion spring interconnected with said piston and cylinder and disposed coaxially therebetween for developing axial and torsional biasing forces on said piston.

17. A disc brake mechanism comprising a disc fixed for rotation with rotatable structure to be braked, a housing fixed to structure adapted to resist rotation of said disc, said housing being positioned adjacent but spaced from said disc and having a cylinder therein oriented with its axis generally parallel to the axis of rotation of said disc between said disc axis and the periphery of said disc, a piston mounted in said cylinder for reciprocable movement along and rotational movement about the axis of said cylinder, said piston having one end projecting from said cylinder toward said disc, friction means on said one end of said piston adapted for face-to-face frictional contact with said disc and adapted to develop a resultant frictional force when in said contact tending to rotate said piston about said cylinder axis, means for moving said piston axially of said cylinder for urging said friction means into said frictional contact with said disc and cam means on said piston and housing cooperable in response to said frictionally induced rotation of said piston to develop an axial component of force acting on said piston urging the same toward said disc.

18. A disc brake mechanism as set forth in claim 17 wherein said housing comprises a caliper-type member shaped to straddle the periphery of said disc, said housing having a second cylinder therein and associated piston, friction means, piston moving means and cam means corresponding to the elements recited in claim 17 associated with the first-mentioned cylinder and operative to engage said second friction means with the side of said disc opposite said friction means, said housing having a bridging portion interconnecting the portions thereof containing said first and second cylinders, said bridging portion having the surface thereof remote from the disc shot peened to introduce residual compressive stresses in said housing adapted to resist the outward bending stresses imparted to said housing in reaction to application of braking force to said first and second pistons.

19. A disc brake mechanism as set forth in claim 1 wherein said housing has an extension projecting within said cylinder and said piston has a bore adapted to telescopically receive said extension, said cam means comprising cooperating cam lobe and cam ramp means on the juxtaposed end faces of said extension and piston.

No references cited.

MILTON BUCHLER, *Primary Examiner.*

G. E. A. HALVOSA, *Assistant Examiner.*